O. DEAM.
RECORDING MECHANISM FOR ENGINE ROOM TELEGRAPHS.
APPLICATION FILED OCT. 22, 1908.
998,077.
Patented July 18, 1911.
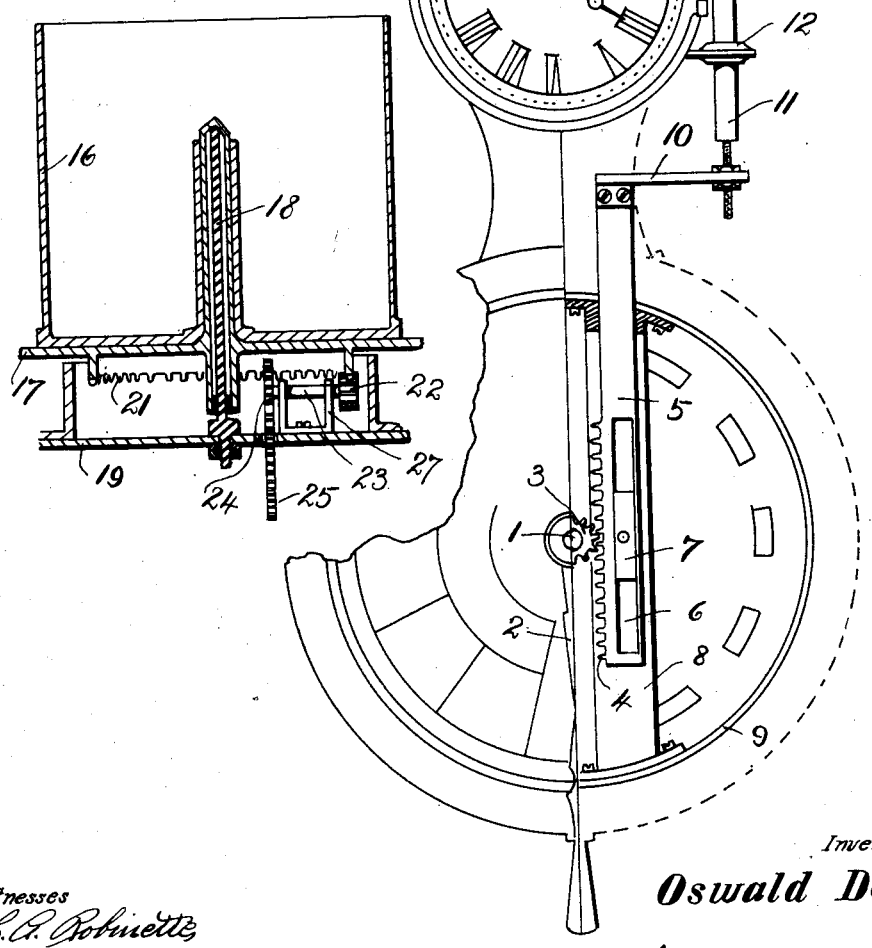
Inventor
Oswald Deam
Witnesses
By Meyer, Cushman & Rea
Attorneys

UNITED STATES PATENT OFFICE.

OSWALD DEAM, OF NEAR CALCUTTA, INDIA.

RECORDING MECHANISM FOR ENGINE-ROOM TELEGRAPHS.

998,077. Specification of Letters Patent. Patented July 18, 1911.

Application filed October 22, 1908. Serial No. 458,991.

*To all whom it may concern:*

Be it known that I, OSWALD DEAM, a subject of His Majesty King Edward VII, Emperor of India, chief engineer of steam pilot vessel *Fraser*, stationed at the Sand Heads, at the mouth of the river Hoogly, near Calcutta, India, have invented a new and Improved Recording Mechanism for Engine-Room Telegraphs and the Like, of which the following is a full, clear, and exact specification.

This invention relates to a new or improved recording mechanism for engine-room telegraphs used on steamers by which a permanent record is kept on a chart of all orders given from the bridge to the engine-room, the exact time such orders are given being also recorded. For this purpose I may mount a chart-carrying-drum so as to be rotated at any desired speed through suitable mechanism actuated by the engine-room clock, and provide a pencil, stylus or like marking instrument adapted to trace a line on such chart as the drum is revolved. This pencil is carried on an arm which is connected to a straight rack with the teeth of which a pinion meshes. This pinion is mounted on the spindle of the engine-room telegraph instrument which carries the indicator actuated from the bridge and is permanently in mesh with the straight rack, so that any alteration in the position of the indicator in the engine-room is immediately registered by a corresponding vertical movement of the pencil on the chart. The chart is, preferably, for the sake of convenience mounted immediately above and rotated by a clock which is fixed to the top of the engine-room telegraph instrument. If desired a similar contrivance may also be operated by the telegraph instrument on the bridge so that two independent records will be kept of all orders given from the bridge and received in the engine-room.

In order that my invention may be readily understood reference will now be made to the accompanying drawings which illustrate by way of an example a convenient form this invention may take applied to an engine-room telegraph instrument.

In these drawings:—Figure 1 is a part sectional view of the engine-room telegraph instrument. Fig. 2 is a part sectional elevation drawn to a larger scale showing one method of driving the chart drum from the clock.

Referring now to Fig. 1, the spindle 1 of the engine-room telegraph instrument carries the indicator 2 and is operated from the bridge in the usual manner. To this spindle 1 is fixed a pinion 3 which meshes with the teeth of a straight rack 4 on the bar 5. A slot 6 is provided in the bar 5 which works on a fixed guide 7 mounted on the bracket 8 which is clamped to the telegraph instrument 9. The bar 5 is shown connected by means of an arm 10 to the rod 11 which works in vertical guides 12, 13 and is provided at its upper end with a pencil or other marking instrument 14 adapted to trace a line on the chart 15 as such chart is revolved with its drum 16 (Fig. 2).

One method of causing the chart 15 to revolve is shown in Fig. 2. In this drawing the chart-drum 16 is shown resting on the disk 17 which rotates on a pin 18 fixed to the frame plate 19. On the outside of the drum 16 two spring clips 20 (Fig. 1) are provided into which both ends of the chart 15 which is preferably printed on paper, are inserted, such chart being retained in position by the pressure of the spring clips. On the underside of the disk 17 a crown wheel 21 is formed which together with the disk is rotated by a small pinion 22 carried on the spindle 23. On the spindle 23 is also mounted a toothed wheel 24 which in turn meshes with a convenient toothed wheel such as 25 in the clock 26 (Fig. 1). The spindle 23 may be carried in bearings 27 fixed to the plate 19 as shown.

The chart 15 to correspond with the dial of the usual engine-room telegraph instrument would be divided into nine horizontal divisions by lines, such divisions being marked respectively "Ahead full;" "Ahead half;" "Ahead slow;" "Stand by;" "Stop;" "Finished with engines;" "Astern slow;" "Astern half;" "Astern full." The chart would also be marked with vertical lines indicating hours and with intermediate lines for periods of 5 minutes more or less. Each chart 15 should preferably be large enough to take slightly more than 4 hours to allow of a few minutes clearance at both ends of each watch to enable a chart to be removed and a fresh one inserted.

In use it is preferable that two chart drums 16 be provided one being fitted with its chart 15 in readiness to slip on immediately at the beginning of each watch.

For this purpose the drum 16 is made free to lift off the disk 17, the pencil 14 being held out of action while the drum is removed and a fresh one inserted.

It will readily be seen that changes, variations and modifications may be made without departing from the general spirit of the invention and it is to be understood that the invention is not restricted to the apparatus shown and described. For instance, instead of the chart being mounted on a rotating drum it may be printed on a long strip of paper and be made to travel by suitable means at a uniform speed past the pencil or other marking instrument.

Having now particularly described and ascertained the nature of my said invention and in what manner the same is to be performed, I declare that what I claim is:—

The combination with an indicator, of a bracket fixed on said indicator and provided with a guide, a bar having an outstanding arm slidable longitudinally on said bracket and provided with a slot to receive said guide, a rack on said bar, an oscillating pinion operated by the movement of the indicator in engagement with said rack, means for supporting a record sheet, a stylus arranged to contact with said sheet, a rod supporting said stylus, a screw on said rod mounted on the arm of said vertically movable bar, and nuts on said screw arranged to adjustably clamp the rod on said arm whereby the position of said stylus with relation to the record sheet may be regulated.

In witness whereof I have hereunto set my hand in the presence of two witnesses.

OSWALD DEAM.

Witnesses:
H. H. REMFRY,
H. G. REMFRY.

---

Copies of this patent may be obtained for five cents each, by addressing the "Commissioner of Patents, Washington, D. C."